(12) United States Patent
Paluncic

(10) Patent No.: US 8,701,836 B2
(45) Date of Patent: Apr. 22, 2014

(54) DEVICE FOR SUPPLYING LUBRICANT AND BEARING ASSEMBLY THEREWITH

(75) Inventor: Zdravko Paluncic, Ludwigshafen (DE)

(73) Assignee: Lincoln GmbH, Walldorf (DE)

( * ) Notice: Subject to any disclaimer, the term of this patent is extended or adjusted under 35 U.S.C. 154(b) by 533 days.

(21) Appl. No.: 12/602,666

(22) PCT Filed: May 8, 2008

(86) PCT No.: PCT/EP2008/003685
§ 371 (c)(1),
(2), (4) Date: Dec. 2, 2009

(87) PCT Pub. No.: WO2008/151698
PCT Pub. Date: Dec. 18, 2008

(65) Prior Publication Data
US 2010/0178000 A1    Jul. 15, 2010

(30) Foreign Application Priority Data
Jun. 14, 2007    (DE) .................. 20 2007 008 531 U

(51) Int. Cl.
*F16C 33/66*    (2006.01)
*F16N 27/00*    (2006.01)

(52) U.S. Cl.
USPC ........................................ 184/7.4

(58) Field of Classification Search
USPC ........................................ 184/7.4
See application file for complete search history.

(56) References Cited

U.S. PATENT DOCUMENTS

| | | | |
|---|---|---|---|
| 3,809,184 A | 5/1974 | Smith | |
| 5,205,378 A * | 4/1993 | Boelkins | 184/55.1 |
| 5,415,249 A * | 5/1995 | Grattan et al. | 184/6.26 |
| 5,495,917 A * | 3/1996 | Pax | 184/7.4 |
| 5,496,113 A | 3/1996 | Winkelmann | |
| 5,687,815 A * | 11/1997 | Antila et al. | 184/7.4 |
| 2010/0322543 A1* | 12/2010 | Paluncic et al. | 384/470 |

FOREIGN PATENT DOCUMENTS

| | | |
|---|---|---|
| DE | 1940586 A1 | 3/1971 |
| DE | 4395740 C1 | 6/1997 |
| DE | 202006011249 U1 | 9/2006 |
| WO | 2007134815 A1 | 11/2007 |

OTHER PUBLICATIONS

International preliminary Report on Patentability mailed Jan. 21, 2010 regarding PCT/EP2008/003685, 7 pages.
Schrama, Roll neck bearing lubrication systems, Mar. 1989, Iron & Steel Engineer, pp. 41-46.

\* cited by examiner

*Primary Examiner* — William E Dondero
*Assistant Examiner* — Mark K Buse
(74) *Attorney, Agent, or Firm* — Senniger Powers LLP

(57) ABSTRACT

The invention relates to a device for supplying lubricant, particularly for dosing lubricant to lubrication points (2) in a roller assembly or the like. The invention further relates to a bearing assembly which is inserted, for example, in a roller assembly, and which has at least one such device for supplying lubricant. The device is equipped with a conduit (4, 5) via which a lubricant source is connected to multiple lubrication points (2), wherein at least one injector (6) designed as a metering valve is provided in the conduit as a cartridge insert for releasing a defined amount of lubricant in a cycle of pressure application and pressure release of the supplied lubricant. A connecting channel is assigned to the injector (6) in such a manner that lubricant is fed from the lubricant source, past the injector (6), in the direction of a lubrication point (2) lying downstream.

15 Claims, 1 Drawing Sheet

DEVICE FOR SUPPLYING LUBRICANT AND BEARING ASSEMBLY THEREWITH

FIELD OF THE INVENTION

The invention relates to a device for supplying lubricant, in particular, for dosing lubricant to lubrication points in a roller assembly or the like. The invention further relates to a bearing arrangement that is inserted, for example, into a roller assembly, with at least one such device for supplying lubricant. Such a device is known, for example, from DE 20 2006 011 249 U.

BACKGROUND OF THE INVENTION

In roller assemblies, for lubricating bearings, in addition to grease, oil is being used with increasing frequency. Here, a small quantity of oil is transported partially together with air to the bearings. Here, in addition to the transport of the oil, the air also has the function of sealing the bearing from the outside through an elevated pressure. For such application cases, it is known in bearings to provide conduits by means of which oil is fed together with air to the lubrication points of the bearing. Here, a throttling cartridge is allocated to each lubrication point, wherein, by means of this throttling cartridge, a portion of the oil is fed from the conduit to the lubrication point. The remaining oil is led via the conduit to the other lubrication points.

In these known systems, a disadvantage lies in the low accuracy of the dosing and distribution of the lubricant. The accuracy of the dosing and distribution is here essentially dependent on the back pressure at the bearing points. In addition, volume equalization between different lubrication points is possible only with much difficulty.

The problem of the present invention is to provide, relative to these systems, a device for supplying lubricant, as well as a bearing arrangement herewith, that allows the dosing of an exact quantity of the lubricant discharge at each lubrication point, as well as a precise setting of the distribution between the individual lubrication points.

SUMMARY OF THE INVENTION

One aspect of this invention is directed to a device for supplying lubricant to lubrication points in a roller assembly. The device includes a conduit by means of which a lubricant source is connected to several lubrication points. At least one injector formed as a metering valve is inserted as a cartridge insert in the conduit for discharging a defined quantity of lubricant in a cycle comprising pressurization and depressurization of the fed lubricant. A passage channel is allocated to this injector such that lubricant flows from the lubricant source past the injector in the direction to a downstream lubrication point. The passage channel is formed as a bypass channel within the injector.

The invention will be explained below in more detail using embodiments and with reference to the drawing.

BRIEF DESCRIPTION OF THE DRAWINGS

Shown schematically are.

DETAILED DESCRIPTION

In the figures, a device for supplying lubricant to a bearing arrangement, like those that can be used, for example, for roller assemblies or the like, is indicated by a bearing housing 1. In this housing, inner and outer rings (not shown) can be provided with roller bodies (e.g., balls) arranged in-between in raceways, so that the outer ring can rotate relative to the inner ring. Several boreholes 3 that open into the raceways of the balls and thus form the lubrication points 2 extend in the radial direction through the bearing housing 1 of the bearing arrangement.

Figure 1:
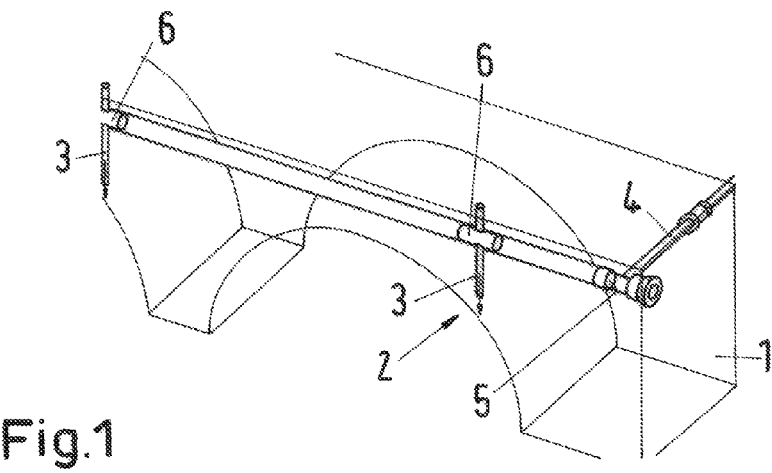
FIG. 1, a bearing arrangement according to the invention in perspective view in some regions.

As indicated in FIG. 1, a conduit in which lubricant, e.g., oil, is fed from a lubricant source (not shown) to the lubrication points 2 is defined by several boreholes 4, 5 in the bearing housing 1. In this conduit 4, 5, a metering valve is formed as a single-line distributor (injector) 6 in the shown embodiment and is inserted as a cartridge insert into the borehole 5.

Figure 2:
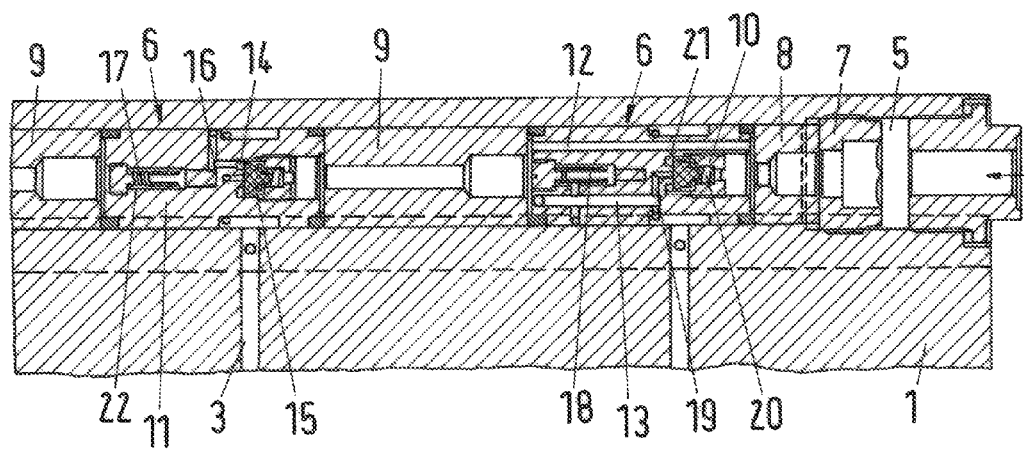
FIG. 2, a longitudinal section of a device according to the invention.

On the right, outer side in FIG. 2, the borehole 5 is closed by an adapter 7 that is screwed into a threaded section of the borehole 5 and in this way fixes the single-line distributor 6 formed as a cartridge insert. Between the single-line distributors 6, spacing sleeves 8, 9 are provided in the conduit, so that each single-line distributor 6 is allocated to a borehole 3 or lubrication point 2. The conduit 4, 5 can be closed by a connection element that is formed for connection to an external lubricant conduit.

Each single-line distributor 6 is essentially formed by an inlet cap 10 and a sleeve 11 that together form the cartridge inserts. The outer diameter of the cartridge insert is here smaller than the outer diameter of the adapter 7, so that the cartridge insert can be easily inserted into the borehole 5.

The lubricant inlet defined by the central opening in the inlet cap 10 or the sleeve 11 connects to a passage channel 12 that leads like a bypass conduit through the sleeve 11 to the downstream spacing sleeve 9. On the lower side in FIG. 2, each single-line distributor 6 is provided with a lubricant outlet 13 facing the roller bodies to be lubricated. The two single-line distributors 6 shown in FIG. 2 are shown rotated by 90° relative to each other, so that, in the two single-line distributors 6, different channels and boreholes are visible that are provided, however, in the two single-line distributors 6.

The lubricant inlet initially opens into a first cylinder space 14 in which a sealing piston 15 working as a reverse valve is guided so that it can move. From the first cylinder space 14, an axial channel 16 leads into a second cylinder space 17 that is on the left in the figures and that opens via boreholes into the lubricant outlet 13. In the second cylinder space 17, a feed piston 18 is guided so that it can move. In addition, a reverse or depressurization channel 19 that opens into the second cylinder space 17 branches from the first cylinder space 14.

The sealing piston 15 is pressurized by a spring 20 toward the left in the figure, so that the sealing piston 15 is pressed against and blocks the depressurization channel 19. Furthermore, the sealing piston 15 is provided with a peripheral sealing lip 21 that allows a flow of a lubricant in the first cylinder space 14 in the feed direction, that is, toward the left in the figure, but prevents a backflow of the lubricant in the opposite direction. The feed piston 18 is guided and sealed in the second cylinder space 17, so that lubricant cannot flow through the second cylinder space 17 past the feed piston 18. A spring 22 presses the feed piston 18 against the feed direction of the lubricant toward the right in FIG. 2.

If lubricant is forced through the conduit 4, 5 into the lubricant inlet of the cartridge insert 6, then the sealing piston 15 is pressed tightly against and closes the depressurization channel 19. Simultaneously, the lubricant can flow past the sealing lip 21 that deforms due to the pressure of the lubricant. The lubricant flows via the axial channel 16 into the second cylinder space 17 and moves the feed piston 18 against the pressure of the spring 22 in the feed direction. In this way, lubricant held in the left region of the second cylinder space 17 is fed through the lubricant outlet 13 to the point to be lubricated.

In the depressurization phase, no additional lubricant is fed via the conduit 4, 5. The sealing piston 15 is set against the depressurization channel 19 only by the force of the spring 20. In contrast, the spring 22 compressed by the pressure phase is designed so that, in the depressurization phase, the feed piston 18 can be moved toward the right in the figure. In this way, the lubricant held to the right of the feed piston 18 in the second cylinder space 17 is forced through the axial channel 16 into the first cylinder space 14. However, the lubricant cannot pass the sealing lip 21 of the sealing piston 15 and lifts this piston against the force of the spring 20 from the depressurization channel 19. Thus, the lubricant can flow through the depressurization channel 19 and can flow from this channel into the second cylinder space 17.

When the feed piston 18 has reached its end position shown on the right in FIG. 2, in a new pressure phase, the lubricant can be forced from the left region of the second cylinder space 17 by the feed piston to the lubricant outlet 13.

The two single-line distributors 6 shown in FIG. 2 have differently shaped feed pistons 18. Thus, the feed piston shown on the left in the figure has a larger diameter and a larger stroke than the feed piston of the single-line distributor 6 shown on the right in the figure. In this way, a larger feed volume is reached for each stroke of the feed piston 18 of the left single-line distributor 6.

Figure 3:
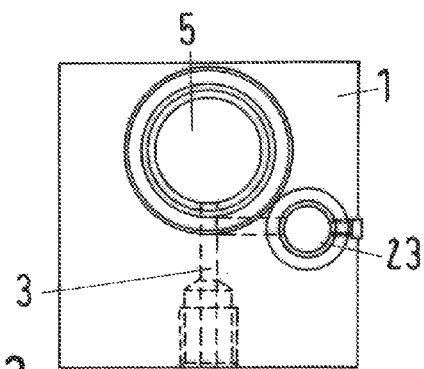
FIG. 3, a cross section of the device according to FIG. 2.

In addition to the conduit 4, 5, in FIG. 2 an air channel 23 is shown with dashed lines and runs essentially parallel to the conduit 4, 5 as can be seen in FIG. 3. Compressed air is led via the air channel 23 to the lubricant outlet 13. By means of a cross borehole, the compressed air is mixed before the lubricant outlet 13 with the lubricant that is dosed from the single-line distributors 6 and that is oil in the shown embodiment. The air transports the oil to the appropriate lubrication point and can simultaneously improve the tightness in a bearing.

It will be observed from the foregoing that the problem referred to in the Background of the Invention is solved by a lubricant supply device of this invention. The device is equipped with a conduit by means of which a lubricant source is connected to several lubrication points. At least one injector formed as a metering valve is inserted as a cartridge insert in the conduit for discharging a defined quantity of lubricant in a cycle comprising pressurization and depressurization of the fed lubricant. A passage channel is allocated to the at least one injector such that lubricant is fed from the lubricant source past the injector in the direction toward a downstream lubrication point. The injectors used according to the invention can be hereby set exactly, for example, by the selection of appropriately different pistons with respect to the quantity of the discharged lubricant. This allows a very exact metering of lubricant to each individual lubrication point. Furthermore, through the arrangement of injectors in the conduit, it is possible, according to the number of lubrication points to be supplied with lubricant, to introduce several injectors one behind the other into the conduit, wherein the passage channel guarantees a supply of lubricant to all injectors. In this way, the injectors can be integrated especially easily into a borehole or the like of a bearing arrangement, wherein an especially compact and closed construction is enabled.

The passage channel is formed according to the invention as a bypass channel within the injector. In other words, the passage channel allows a flow connection from the lubricant source past an injector to the next downstream injector. If the passage channel is formed, for example, as a borehole running through the body of the injector, then no additional boreholes or recesses must be provided in the bearing arrangement. Furthermore, a separate line for supplying all injectors with lubricant can also be eliminated.

According to a preferred embodiment of the invention, the conduit is formed by a borehole in a component to be supplied with lubricant, for example, a bearing housing or an inner or outer ring of a bearing, wherein, in the borehole, the injectors are provided and between these injectors at least one spacing sleeve is provided. Through the number and length of the spacing sleeves, the distance between the injectors can be set according to the position of the lubrication points.

It is preferred if at least one injector is formed as a single-line distributor for dosing lubricant to a lubrication point. Here, the injector advantageously has one lubricant inlet and a lubricant outlet facing a point to be lubricated, wherein, between this inlet and outlet, a sealing piston and a feeding piston are guided so that they can move in a sleeve that is formed together with an inlet cap as a cartridge insert that can be inserted or screwed into a conduit and/or borehole. Here, the sealing piston has a peripheral sealing lip that allows the through-flow of a lubricant in the feeding direction and that prevents a backflow of the lubricant and that can be moved between a position opening a depressurization channel and a position blocking this depressurization channel, wherein the feeding piston can be moved against the force of an elastic element for feeding lubricant to the position to be lubricated in the feeding direction and for suctioning lubricant by the force of the elastic element against the feeding direction. Such a configuration of the injectors allows an especially reliable and low-maintenance operation for a simultaneously compact construction.

Furthermore, an adapter with an external thread can be provided for fixing the cartridge insert or the injector into a conduit and/or into a threaded borehole, wherein the cartridge insert can have, at least in some regions, a smaller outer diameter than the adapter. In this way, the metering valve (injector) formed as a cartridge insert can be easily inserted into a borehole or conduit and can be fixed by screwing in the adapter.

According to one preferred embodiment of the invention, the injectors are formed for activation by successive pressurization and depressurization by means of oil as the lubricant. The lubricant fed during a cycle comprising pressurization and depressurization is thus used simultaneously for activating the injectors.

In a few applications, it has proven especially advantageous if, in addition to the oil or similar lubricant, air is also fed to the lubrication points. In this way, in particular, an air channel running essentially parallel to the conduit can also be provided for supplying compressed air to at least one of the lubrication points. Here it is preferred that the air channel and/or a branch channel of the air channel opens downstream from an injector and before the lubrication point into a feed line leading to the lubrication point for air and the lubricant, in particular, oil. The quantity of oil dosed from the injector can thus be transported by the air to the lubrication point. Simultaneously with this function as a transport medium, the air can also exert a sealing function in the component to be lubricated, for example, a bearing, due to the overpressure.

In the device for supplying lubricant according to the invention, the injectors do not all have to have an identical feed volume. Instead, injectors can also be provided with different feed volumes. This can be achieved, for example, through a different design of the sizes of the feed pistons or the strokes of the feed pistons.

The invention further relates to a bearing arrangement, for example, a bearing arrangement in a roller assembly, with an outer ring and an inner ring, which can rotate relative to each other, and with roller bodies, in particular, balls, that are arranged between the outer ring and the inner ring. Here, there is at least one advantageously radial borehole according to the invention in the bearing housing or in the outer ring and/or in the inner ring. This borehole is connected to at least one injector of a device provided in and/or on the inner or outer ring for supplying lubricant in the manner described above.

LIST OF REFERENCE SYMBOLS

1 Bearing housing
2 Lubrication point
3 Borehole
4 Borehole (conduit)
5 Borehole (conduit)
6 Single-line distributor (injector)
7 Adapter
8 Spacing sleeve
9 Spacing sleeve
10 Inlet cap
11 Sleeve
12 Passage channel
13 Lubricant outlet
14 First cylinder space
15 Sealing piston
16 Axial channel
17 Second cylinder space
18 Feed piston
19 Depressurization channel
20 Spring
21 Sealing lip
22 Spring
23 Air channel

The invention claimed is:

1. A device for supplying lubricant to lubrication points, said device comprising a conduit by means of which a lubricant source is connected to said lubrication points, an upstream injector formed as a metering valve for discharging a defined quantity of lubricant in a cycle comprising pressurization and depressurization of lubricant fed from the lubricant source and the upstream injector including a passage channel for flow of lubricant from the lubricant source past the upstream injector toward a downstream lubrication point via a next downstream injector, wherein the passage channel is formed as a bypass channel within the upstream injector for flow of lubricant from the lubricant source past the upstream injector to the next downstream injector, wherein the upstream injector is formed as a single-line distributor for dosing lubricant to a lubrication point and has a lubricant inlet and a lubricant outlet facing the lubrication point, wherein, between this inlet and this outlet, a sealing piston and a feed piston are guided so that they can move in a sleeve that is formed together with an inlet cap as a cartridge insert that can be inserted into said conduit, wherein the sealing piston has a peripheral sealing lip that allows a through-flow of lubricant in the feed direction and that prevents a backflow of lubricant and can move between a position opening a depressurization channel and a position blocking the depressurization channel, and wherein the feed piston can be moved against the force of an elastic element for feeding lubricant to said lubrication point in the feed direction and for drawing lubricant by force of the elastic element against the feed direction.

2. A device for supplying lubricant according to claim 1, wherein the upstream and next downstream injectors in the conduit have different feed volumes.

3. A device for supplying lubricant according to claim 1, wherein said conduit communicates with a radial borehole in a bearing arrangement comprising inner and outer rings and roller bodies between the rings, and wherein said upstream injector is operable to deliver lubricant to said radial borehole.

4. A bearing arrangement incorporating the device for supplying lubricant according to claim 1, said bearing arrangement comprising inner and outer rings rotatable relative to one another, roller bodies between the rings, and a radial bore in at least one of the inner and outer rings, said conduit communicating with said radial bore such that said upstream injector is operable to supply lubricant to the radial bore.

5. A device for supplying lubricant to lubrication points, said device comprising a conduit formed by a borehole in a component to be supplied with lubricant by means of which a lubricant source is connected to said lubrication points, an upstream injector formed as a metering valve inserted entirely in the conduit as a cartridge insert for discharging a defined quantity of lubricant in a cycle comprising pressurization and depressurization of lubricant fed from the lubricant source, and the upstream injector including a passage channel for flow of lubricant from the lubricant source past the upstream injector toward a downstream lubrication point via a next downstream injector spaced from the upstream injector by a sleeve, wherein the passage channel is formed as a bypass channel within the upstream injector for flow of lubricant from the lubricant source past the upstream injector to the next downstream injector.

6. A device for supplying lubricant according to claim 5, wherein an adapter with an outer thread for fixing the cartridge insert in said conduit, wherein the cartridge insert has a smaller outer diameter than the adapter at least in some regions.

7. A device for supplying lubricant according to claim 5, wherein the upstream injector is formed for activation by successive pressurization and depressurization by means of oil as a lubricant.

8. A device for supplying lubricant according to claim 5, further comprising an air channel running generally parallel to the conduit for supplying compressed air to at least one of the lubrication points.

9. A device for supplying lubricant according to claim 8, wherein the air channel and/or a branch channel of the air channel opens downstream from the upstream injector and upstream from the downstream lubrication point into a feed line leading to the downstream lubrication point.

10. A device for supplying lubricant according to claim 8, wherein the upstream and next downstream injectors in the conduit have different feed volumes.

11. A device for supplying lubricant according to claim 8, wherein said conduit and air channel communicate with a radial borehole in a bearing arrangement comprising inner and outer rings and roller bodies between the rings, and wherein said upstream injector and air channel deliver lubricant and compressed air to said radial borehole.

12. A bearing arrangement incorporating the device for supplying lubricant according to claim 8, said bearing arrangement comprising inner and outer rings rotatable relative to one another, roller bodies between the rings, and a radial bore in at least one of the inner and outer rings, said conduit and air channel communicating with said radial bore such that said upstream injector and air channel are operable to supply lubricant and compressed air to the radial bore.

13. A device for supplying lubricant according to claim 5, wherein the upstream and next downstream injectors in the conduit have different feed volumes.

14. A device for supplying lubricant according to claim 5, wherein said conduit communicates with a radial borehole in a bearing arrangement comprising inner and outer rings and roller bodies between the rings, and wherein said upstream injector is operable to deliver lubricant to said radial borehole.

15. A bearing arrangement incorporating the device for supplying lubricant according to claim 5, said bearing arrangement comprising inner and outer rings rotatable relative to one another, roller bodies between the rings, and a radial bore in at least one of the inner and outer rings, said conduit communicating with said radial bore such that said upstream injector is operable to supply lubricant to the radial bore.

* * * * *